E. BAYLISS.
Wheel-Harrows.

No. 146,224.  Patented Jan. 6, 1874.

Witnesses.
Alex Mahon
J. T. Thomas

Inventor.
Edwin Bayliss
by A. M. Smith
attorney

UNITED STATES PATENT OFFICE.

EDWIN BAYLISS, OF MASSILLON, OHIO.

IMPROVEMENT IN WHEEL-HARROWS.

Specification forming part of Letters Patent No. 146,224, dated January 6, 1874; application filed September 17, 1873.

*To all whom it may concern:*

Be it known that I, EDWIN BAYLISS, of Massillon, Stark county, Ohio, have invented certain new and useful Improvements in Wheel-Harrows and Cultivators, of which the following is a full, clear, and exact description, reference being had to the accompanying drawings, in which—

Figure 1:
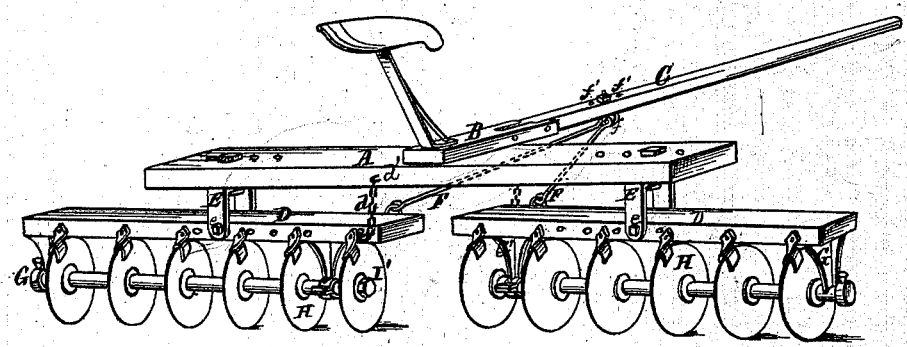
Figure 2:
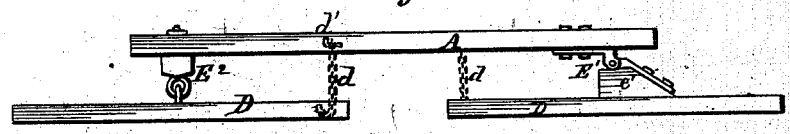
Figure 3:
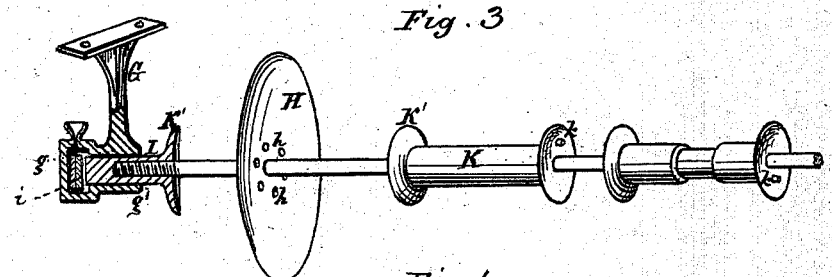
Figure 4:
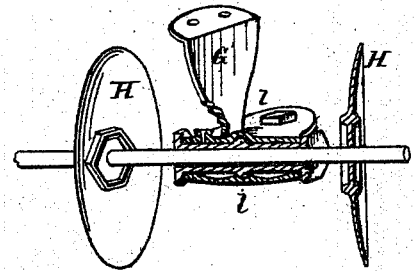

Figure 1 is a perspective view of my improved wheel-harrow. Fig. 2 is a rear elevation of the transverse frame-bar and wheel-gang bars, showing modifications in the form of the hinge-connection. Fig. 3 is a perspective of one of the wheel-gang shafts, showing the outer pendent bracket-bearing in section, and also showing the construction of the disks and spacing-ferrules; and Fig. 4 is a similar view of the inner pendent bracket.

Similar letters of reference denote corresponding parts in all the figures.

My invention relates to the improvement of that class of machines known as combined wheel or disk harrows and seeding-machines, in which the harrow, cultivator, or pulverizer disks are arranged in gangs upon horizontal shafts; and has for its object the construction of the machine in such manner as to adapt the gangs to follow or conform to the uneven surface of the ground over which they are drawn; also, to prevent the rapid wear of the bearings of the gang-shaft, and to provide for and insure the uniform rotation of the several disks or wheels of the same gang; and to this end the invention consists, first, in combining the wheel-gang bars or frames with the main frame by means of a horizontal pivot arranged transversely to the gang-bar, and in line with the path of the machine, or substantially so, in such manner as to permit the gangs to conform to the surface of the ground, as hereinafter described; second, the invention consists also in certain details of construction and arrangement, all as hereinafter described.

In the accompanying drawings, A represents the main frame or main transverse bar of the main frame; B, the longitudinal bar or bars, to which the pole or tongue C is pivoted. D D are the gang bars or frames, which, instead of being bolted directly to the under face of bar A, or connected therewith by a vertical pivot simply for permitting the adjustment of their angle of relation to the path of the machine, as is usual in this class of machine, I connect by means of angle-iron or hinge plates E, which, in their upper horizontal part, are connected with the bar A by a vertical pivot, permitting the adjustment of the angle, as above explained, and the vertical or pendent arms of which embrace the gang-bars D, and are connected therewith by a horizontal transverse through bolt or pivot at $e$, which permits the gang-bar to rock or be deflected from its horizontal position for following or conforming to the uneven surface of the ground.

In Fig. 2 modifications in the construction of the hinge are shown. $E^1$ represents a strap-hinge, one leaf of which is pivoted or bolted to bar A, and the other to a block, $e'$, on the bar D; and $E^2$ represents eyebolts, one secured in bar A, and the other in bar D, and the two forming a double joint, permitting the movements above described. The bar D is removed by the hinge-connection sufficiently far from bar A to permit the required vibration of the former, and has its hinge or pivotal connection therewith located outside the middle of its length in such manner as to throw the greater strain or drag upon its inner end, which is connected adjustably with the tongue by means of a draft-rod, F, and an eyebolt, $f$, and by setting the latter forward or back in any one of a series of bolt-holes, $f'$, in the tongue, the angle of relation of the gangs to the path of the machine may be adjusted as desired. $d$ are adjustable links or chains attached at one end to the inner ends of the gang-bars D, and at their upper ends to the frame-bar A or tongue C, for limiting the downward movement of the inner ends of the bars D, the frame-bar A itself serving as a stop to limit the upward movement of the inner ends of said bars D. The chains $d$ may be lengthened or shortened by hooking different links into the hooks $d'$, to limit the flexibility of the disk-gangs to suit the ground, as set forth, and to prevent the gangs from turning too far on the horizontal pivots in turning corners, &c. The outside hangers G of the pulverizer receive the ends of the spindles upon which the two gangs of disks revolve; and as the disks are dished, with the concave side turned toward the center or tongue of the pulverizer, and as the inner end of each gang is arranged to travel somewhat in advance of the outer end, the disks revolve in lines oblique to the line of draft, and have a tendency to gather and throw the soil inward, and consequently bring the pressure of the soil against the hollow sides of the disks, pressing the spindles outward, and hard into the recesses or boxes of the outside hangers. This pressure, in the present form of construction, causes the hanger soon to wear through, and need renewing. Fig. 3 shows my improved construction, the box being formed with a recess, $g$, at the closed end, cored out in the casting, round, but of greater diameter than the open end $g'$ of the box, the latter being made to loosely fit the spindle. This recess is for the twofold purpose of holding a reserve of oil for lubricating the end of the spindle, and for the reception of two or more solid leather disks or washers, $i$, made to fit loosely in the recess, but to pass through the open end of the box only with considerable pressure, to insure their always remaining in place. These leather washers take the pressure off the spindle, and, being constantly oiled, owing to the oil-receptacle, prevent the wear referred to above. The inner pendent $G'$ is provided with a divided bearing, each half of which is cast with a central groove, and the lower with a reservoir, the former for the reception of a collar on the inclosed thimble, and the latter for the reception of oil for keeping the journal lubricated. The collar $l$ serves to relieve the end thrust, and to take the wear of the shaft, and being thus inclosed is protected from the dirt and grit to which the ordinary wearing-surfaces in this class of machines are exposed. The disks H are provided with a series of perforations, $h$, arranged in a circle around the spindle, and the hubs $K'$ of the spacing-thimbles K are provided with spurs or teats $k$, which enter any one of the series of perforations, and all being clamped together by the usual nuts I I', uniform rotation of the disks is insured. Instead of having the perforations, the disks may be cast with sockets on their opposite faces, as shown in Fig. 4, made polygonal in form, and consisting of a raised bead or flange surrounding the central perforation, and sufficiently enlarged to receive the ends or hubs of the ferrules made of corresponding form, but somewhat less in diameter, so as to allow for inaccuracies in the castings, but at the same time large enough to insure the rotation of the disks and thimbles together. The nut which secures the end or last ferrule in place, should be enlarged sufficiently to rest on the face of the bead forming the socket. By the employment of the series of perforations $h$, and pins or polygonal sockets and hubs, as shown, the disks may be adjusted relatively to each other and to the thimbles, to compensate for variations in warping of the parts in cooling, and also for inaccuracies in molding. The outer ends of frame-bar A may be provided with boxes to receive weights for increasing the efficiency of the harrow, or adapting it to the character of the ground on which it is used.

When used as a cultivator, the two gangs of disks may be separated either by moving the perpendicular pivots in the main frame, or the horizontal pivots in the gang-planks, or both, so as to straddle the row of corn or other crop to be cultivated, and if necessary shorter gangs can be used, consisting of a less number of disks to suit the different widths between rows of different kinds of crops.

By supplying shorter gang-planks and rods for the lesser number of thimbles and disks, the manufacturer may at this slight extra cost furnish a combined pulverizer and cultivator, as the disks, thimbles, nuts, hangers, &c., can be common to both.

The seeding attachment may be of any usual or preferred construction, and may be applied in the manner usual in this class of machines.

Having now described my invention, what I claim as new, and desire to secure by Letters Patent, is—

1. The adjustable wheel or disk gangs D, united to the transverse frame-bar A by a vertical pivot, and also by a horizontal pivot, whereby the angle of said wheel-gangs can be adjusted as described, while at the same time they are free to conform to the uneven surface of the ground, independently of the main frame and of each other, all combined substantially as described.

2. The combination of the wheel-gangs D, connected with the main frame A by vertical pivots, as described, with the tongue C and adjustable draft-rods F, substantially as and for the purpose set forth.

3. The adjustable wheel-gangs D united to the frame-bar by a horizontal pivot, as described, in combination with chains or stops for limiting the vibrations of said gangs on said horizontal pivot, as set forth.

4. The harrow-disks H provided with the polygonal sockets, or an equivalent device for permitting their adjustment, in combination with the ferrule K, constructed substantially as and for the purpose described.

EDWIN BAYLISS.

Witnesses:
J. T. THOMAS,
ALEX. MAHON.